April 15, 1952

F. A. HESTER 2,592,567

FACSIMILE RECORDER

Filed Aug. 4, 1947

2 SHEETS—SHEET 1

FRANK A. HESTER
*INVENTOR.*

BY Alfred W. Barber
ATTORNEY

April 15, 1952 F. A. HESTER 2,592,567

FACSIMILE RECORDER

Filed Aug. 4, 1947 2 SHEETS—SHEET 2

FRANK A. HESTER
*INVENTOR.*

*BY* Alfred W. Barber
ATTORNEY

Patented Apr. 15, 1952

2,592,567

UNITED STATES PATENT OFFICE 2,592,567

FACSIMILE RECORDER

Frank A. Hester, New York, N. Y., assignor to Faximile, Inc., New York, N. Y., a corporation of Delaware Application August 4, 1947, Serial No. 765,936

2 Claims. (Cl. 346—101)

The present invention concerns electrical recorders and scanners and, in particular, recorders and scanners of the type employing the combination of helical and linear elements for facsimile recording, scanning, and the like.

In the art of facsimile, an original copy is scanned by a small spot of light and the electrical variations set up in a photo-electric cell due to variations in density of the original copy are amplified and utilized, usually at a remote point, to impress a record sheet with corresponding density variations, or if negative copy is desired, their inverse. The original copy and the recording are usually scanned line by line until the subject matter is completely covered. Synchronizing and phasing means are employed so that points on the recorded copy correspond in position, as well as in density, to the original copy, so that a true facsimile results. A convenient method of recording is by means of a helical electrode, rotated at an appropriate speed, and an intersecting stationary linear electrode with the recording sheet passing therebetween. As the helical electrode rotates the point of intersection between it and the linear electrode, through the recording sheet, moves from side to side across the recording sheet and a steady motion of the recording sheet completes the scanning operation. The resolution possible with such a system depends upon a number of factors as, for instance, the size of the scanning spot at the pick up end, the electrical characteristics of the transmission circuit and amplifiers, and the size and shape of the scanning spot at the receiving end. The present invention is concerned with problems connected with the recorders utilizing helical and linear electrodes. It also concerns the analogous problems in scanners utilizing helical and linear slots intersecting to define a scanning spot.

The size and shape of the recorded spot produced by the helical and linear electrodes pressing upon opposite sides of the recording sheet depends upon a number of factors. In the past, it was assumed that the principal factors were the thickness of the linear electrode and the diameter of the wire forming the helical electrode although it may have been realized that the pressure between the electrodes, determining the amount of penetration into the paper, may have been a secondary factor. It has been found, according to the present invention, that the angle of intersection between the helical and linear electrodes is a most important factor. It has also been found, according to the present invention, that the power required to make a mark of given density, that is, the marking efficiency of a helix and linear electrode type recorder, depends upon several factors. It has also been found that an important relationship exists between the thickness of the linear electrode or its contact breadth, the diameter of the helical electrode wire or its contact breadth, the angle of intersection between the linear and helical electrodes, the resolution capabilities of the recorder and the efficiency of marking upon the record sheet. In the past, it was assumed that resolution could be improved merely by decreasing the diameter of the wire forming the helical electrode, but according to the present invention, it has been found that this not only may not improve the resolution, but it may also greatly decrease the efficiency of marking on the record sheet. Thus, it has been found, according to the present invention, that an optimum condition exists among all the factors involved for any given set of conditions. The findings of the present invention are valid for any recording medium in which the density of the mark produced in any given elemental area is a function of the intensity of the recording current and its duration through the area. They are also valid in any device in which the response is proportional to the area of the intersection between the helical and linear elements such as in a scanner employing intersecting helical and linear slots to define a scanning spot.

One object of the present invention is to provide a facsimile recorder or scanner capable of providing better detail or resolution than has hitherto been possible, while maintaining or even improving the response efficiency.

Another object of the present invention is to improve both the detail and the efficiency of marking in a recorder embodying a helical and a linear electrode.

Still another object of the present invention is to improve the marking efficiency of a recorder employing a helical and a linear electrode while maintaining the resolution capabilities of the system.

These and other objects of the present invention will be apparent from the detailed description of the invention given in connection with the various figures of the drawings.

In order to understandably present the following detailed description of my invention, I will set forth the terms to be used in such description, together with a definition of their meaning.

M, marking efficiency, is inversely proportional to the power required to produce a mark of a given density and is particularly associated with the recording of a signal.

Response efficiency is the efficiency with which a desired result is accomplished, whether it be a signal in the photo-electric cell or a mark on the paper. This term is a generalization of the particularized marking efficiency defined above.

$\theta$ is the angle between the helix and the linear electrode, measured so that it increases in value as the diameter of the helix is made larger.

R is the ratio of the helix contact breadth to the linear electrode thickness.

H/V is the ratio of the horizontal definition to the vertical definition.

A is a dimension corresponding to the effective width of the linear electrode.

RA is the effective width of the intersecting helical electrode.

The terms definition and resolution are used in accordance with the normal connotation given to such terms when used in equipment of this type.

Figure 1:
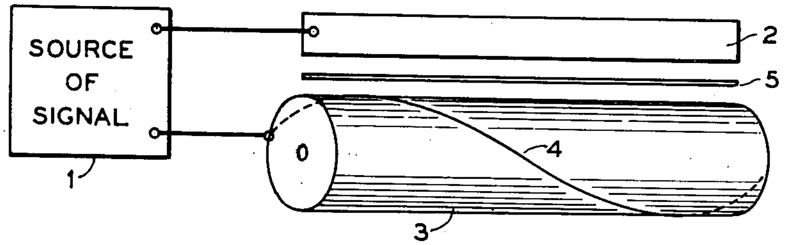
Fig. 1 shows a simplified drawing of the basic components of a recorder embodying helical and linear electrodes.

Fig. 1 shows a simplified drawing of a recording scanner utilizing a helical and linear electrode for marking upon a record sheet. A source of signal 1 may be taken to represent any source of facsimile signals up to the point where they are applied to the recording electrodes. The recording signals from source 1 are impressed upon the record sheet 5 between linear electrode 2 and helical electrode 4. Helical electrode 4 may be any suitable form of electrode such as a wire as shown mounted in any convenient fashion such as being drawn around and across the surface of drum 3. Marking is accomplished at the intersection between linear electrode 2 and helical electrode 4 upon recording sheet 5 passing therebetween. Conventional means may be employed to rotate drum 3 at the desired synchronous speed and for advancing recording sheet 5, details of which are not shown. A convenient type of recording sheet is one which is impregnated with an electrolytic solution which darkens in accordance with the variations in the instantaneous value of the recording signal.

Figures 2, 3:
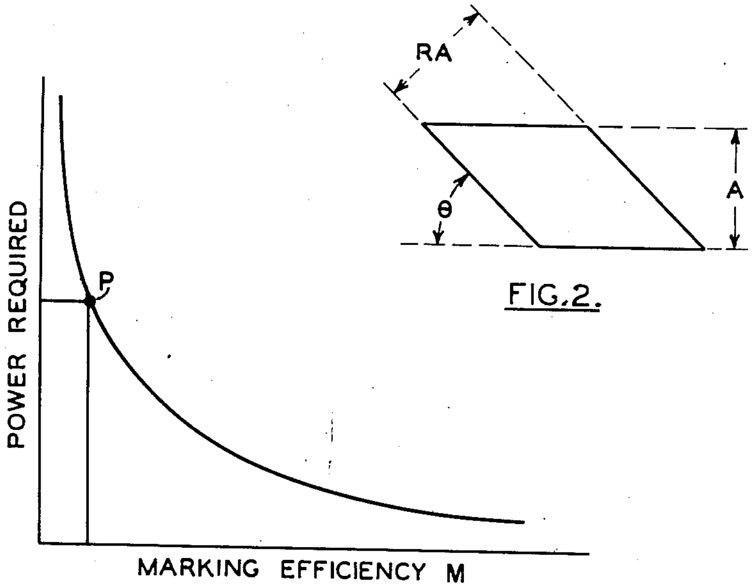
Fig. 2 shows a diagram representing the area of intersection between the helical and linear elements.
Fig. 3 shows a curve of power required versus marking efficiency for a given density of mark on the recording sheet.

Fig. 2 shows the theoretical aspect of the recording spot in a recorder such as the one shown in Fig. 1. The shape of the actual recording spot is such a close approximation to this that the present discussion is valid for all practical cases. In the recording spot, as shown in Fig. 2, the height "A" is a dimension corresponding to the effective width of the linear electrode while dimension "RA" is the effective width of the intersecting helical electrode. If the helical electrode has a rectangular cross-section, "RA" is its actual width, while if it is round or some other shape, "RA" depends upon the pressure and the characteristics of the paper. The angle of intersection between the helical and linear electrodes is the angle $\theta$, so measured, as shown, as to have values greater than zero but less than 90°.

It will be seen from the consideration of Figs. 1 and 2 that an angle of intersection between the helical and linear electrodes $\theta$ of 45° is obtained with a helix having a circumference equal to its pitch. Angles greater than 45° are obtained when the circumference is made greater than the pitch, the angle being 75° when the circumference is 3.73 times the pitch. Normally, helical electrodes have a single turn and are used with a linear electrode having a length equal to the pitch of the helical electrode. The length of the linear electrode and pitch of the helical electrode is determined by the width of paper upon which recordings are to be made. In constructing a recorder in accordance with the teaching of this invention, the helical electrode is formed on a drum having a circumference at least equal to its length. Following explanations will make it clear that very little is gained and something is lost by making the circumference greater than 3.73 times the length. In the past, in recorders intended for high detail recording, the angle $\theta$ has been considerably less than 45°. It was generally supposed that detail in the recorded copy could only be increased by decreasing either the thickness of the linear electrode or the diameter of the helical electrode. It has been found, according to the present invention, that with a relatively small angle of $\theta$, decreasing the diameter of the helical electrode may result in little if any improvement in recorded detail. This is particularly true of the horizontal detail. In connection with this, a very significant relationship has been discovered. This is that the horizontal detail never can be equal to the vertical detail for angles of $\theta$ of less than 45°. Thus, since it is generally agreed that the horizontal detail should be as good or better than the vertical detail in the recorded copy, it has been found that recorders previously available have not been capable of fulfilling this important requirement. We may then summarize the first portion of the discovery of the present invention by saying that the angle of intersection between the helical and linear electrodes must be greater than 45° in order to achieve horizontal detail or resolution at least as great as the vertical detail or resolution.

In the prior art, it has not been appreciated that increased definition with good marking efficiency can be had with $\theta$ more than 45°, and, in the past, recorders intended for high detail recording have used angles less than 45°.

An additional important discovery has been made, according to the present invention, and that is that the marking efficiency is a function of the effective contact width of the helical electrode. While the resolution may not be improved by decreasing the width of the helical electrode, it will readily be seen that the area of intersection will decrease as the effective contact width is decreased. In order to achieve a certain density of mark in the recording sheet, a certain amount of current has to be passed through the sheet. For any given area of intersection between the helical and linear electrodes, a certain voltage will be required to pass this current through the sheet. If the area is decreased, by decreasing the effective contact width of the helical electrode, a higher voltage will be required to pass the current and hence a greater amount of power.

Fig. 3 shows this relationship in graphic form. We may define a quantity, in connection with this recording process, to describe the power required to produce a mark of given density. We may call this quantity "marking efficiency." Fig. 3 shows a curve of power required to mark the record sheet plotted against marking efficiency "M." If the marking efficiency becomes too low, the power required becomes too high for a number of reasons. One limiting factor may be the point at which the recording sheet chars and this may be, for instance, point "P" on the curve. Hence, in order to produce marking without charring the paper, marking efficiencies greater than that corresponding to "P" will be required. The utilization of large amounts of power is also undesirable from a cost standpoint since large amplifiers and power equipment will be required. Thus, from a marking efficiency standpoint, we come to the conclusion that we should use the largest possible effective contact width of helix wire in order to keep the power requirement as low as possible. Resolution and marking efficiency are closely related as will be described in detail below.

One way in which the meaning of horizontal and vertical definition may be more readily visualized and evaluated is to reduce the actual recording area to an equivalent rectangle having the same electrical characteristics. Equivalent electrical characteristics may be defined as a characteristic which results in the same pattern on a recording sheet when impressed with the same signal. The rectangle providing the same characteristics as a parallelogram as set forth above has a height equal to "A," the height of the parallelogram, and a length along the horizontal dimension equal to $$\frac{A}{\sin \theta}\sqrt{\cos^2 \theta + R^2}$$

Thus, if we define the definition or resolution either vertically or horizontally as the reciprocal of the length of the equivalent rectangle in that dimension, the ratio of horizontal to vertical definition is $$\frac{H}{V} = \frac{\sin \theta}{\sqrt{\cos^2 \theta + R^2}}$$

If the horizontal definition equals the vertical definition, the above formula becomes $$\sqrt{\cos^2 \theta + R^2} = \sin \theta$$

$$\cos^2 \theta + R^2 = \sin^2 \theta$$

$$R = \sqrt{\sin^2 \theta - \cos^2 \theta}$$

Figure 5:
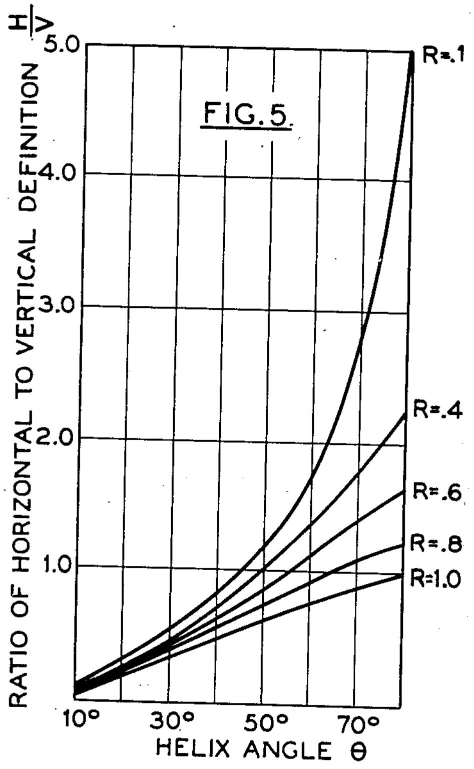
Fig. 5 shows various curves of the ratio of horizontal to vertical definition H/V plotted against angle $\theta$ between the helix and linear electrode for various ratios R of helical electrode contact breadth to linear electrode thickness.

The ratio of equivalent horizontal to vertical definition has been plotted in Fig. 5 for various ratios "R" of helix wire contact breadth to linear electrode thickness. The plot of horizontal divided by vertical definition H/V for various values of "R" has been made against various values of $\theta$.

Figure 4:
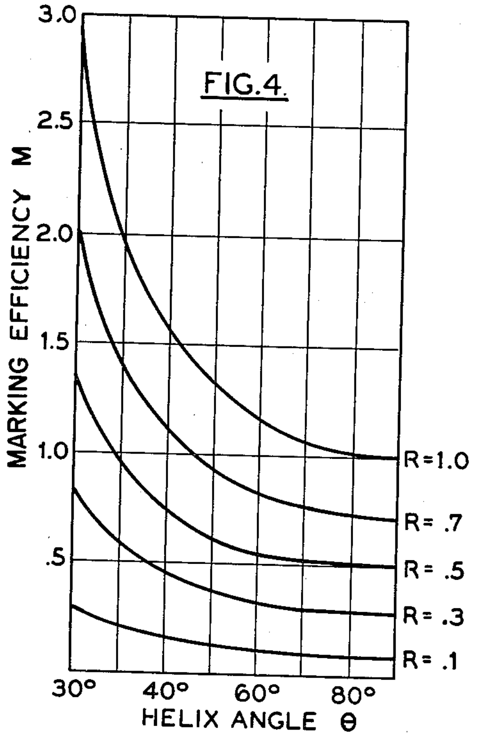
Fig. 4 shows various curves of marking efficiency M plotted against angle $\theta$ between the helix and linear electrode for various ratios R of helix wire contact breadth to linear electrode thickness.

As has been set forth above, the marking efficiency varies with the effective contact width of the helical recording electrode and the angle of intersection between the helical and linear electrodes. In Fig. 4 are shown curves of marking efficiency M plotted against angle $\theta$ for various vales of "R."

The marking efficiency factor M plotted in Fig. 4 may be expressed mathematically. Mathematically, the marking efficiency of a recorder employing a helical and linear electrode is $$M = \frac{R}{\sin \theta}$$

An inspection of Fig. 5 will show that increasing angle $\theta$ increases the ratio of horizontal to vertical definition H/V. It also shows that as "R" is decreased, the ratio increases more rapidly. Similarly, an inspection of Fig. 4 shows that an increase of angle $\theta$ decreases the marking efficiency M. In order to achieve an optimum condition the characteristics of both Figs. 4 and 5 must be taken into consideration.

Figure 6:
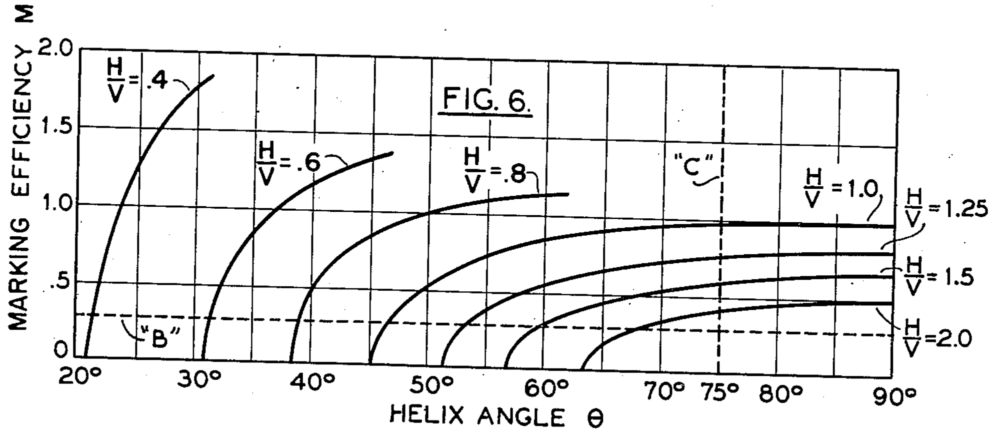
Fig. 6 shows various curves of marking efficiency M plotted against angle $\theta$ of intersection between helical and linear electrodes for various ratios H/V of the ratio of horizontal to vertical definition.

In Fig. 6, the relationships between marking efficiency M and angle $\theta$ are plotted for various values of horizontal to vertical definition ratio H/V. These curves show that horizontal definition equal to vertical definition can only be achieved by an angle $\theta$ equal to 45° or more. Thus, prior art recorders having angles between the linear and helical electrodes of less than 45°, no matter how small the diameter of the helical electrode was made, could never achieve equality between horizontal and vertical definition. Since it can be assumed that it is desirable to have the horizontal definition at least equal to the vertical definition, the region of interest lies to the right and below the curve marked $$\frac{H}{V} = 1.0$$

As has been pointed out above, if the marking efficiency is too low, the recording sheet may be charred by the recording current. Thus, there is some line such as "B," as shown in Fig. 6, below which operation will result in charring or burning of the recording sheet. In addition to the factor of burning or charring of the recording sheet caused by decreasing the angle $\theta$, the increased power required will also increase the cost of the driving amplifiers. It thus may be assumed that one requirement of a satisfactory facsimile recording system is that operation should take place above the point defined by line "B." It can also be readily seen that increasing angle $\theta$ rapidly increases the diameter of the recording drum. Increasing the size of the recording drum rapidly increases the size and cost of the driving motor and also the velocity of the helical electrode as it passes across the recording sheet. Eventually a limiting point of size, cost, and wear on a recording sheet will be reached such as is defined by line "C." Now, in accordance with the present invention, we are in a position to define the physical parameters of a facsimile recorder which will have optimum characteristics. We may assume that the horizontal definition should be at least equal to the vertical definition, that the recording sheet should not be charred or burned, that the wear on the recording sheet should not be excessive and that the helix drum should not be so large as to require excessive power to drive it. When all these factors are taken into consideration, a satisfactory facsimile scanner should be designed so that the characteristics of the recording spot lie between line "B," line "C," and the curve marked $$\frac{H}{V}=1$$

The curves of Figs. 4, 5, and 6 may be expressed mathematically. In Fig. 4, marking efficiency is related to helix angle $\theta$ for various values of "R." Mathematically the relation is marking efficiency $$M=\frac{R}{\sin\theta}$$

In order to arrive at the curves of Fig. 5, the theoretical definition of a given scanning spot was derived by finding a rectangle giving the same definition and calling it the equivalent rectangle. If this rectangle has a height "A," then it will have a length $$L=\frac{A}{\sin\theta}\sqrt{\cos^2\theta+R^2}$$

The ratio of horizontal to vertical definition will then be $$\frac{H}{V}=\frac{\sin\theta}{\sqrt{\cos^2\theta+R^2}}$$

In Fig. 6, the relations of Figs. 4 and 5 are related for various values of H/V. Mathematically, marking efficiency $$M=\sqrt{\left(\frac{V}{H}\right)^2-\cot^2\theta}$$

is the law of the curves of Fig, 6. Thus for the curve $$\frac{V}{H}=1$$

we have $$M=\sqrt{1-\cot^2\theta}$$

From these curves, we can find the minimum required helix angle $\theta$ for any required value of marking efficiency M and the ratio of horizontal to vertical definition H/V. Similarly, we may choose any two factors and find the third depending on the desired performance of the system. Thus, $$\frac{V}{H}=\sqrt{M^2+\cot^2\theta}$$

expresses definition in terms of marking efficiency and helix angle and $$\theta=\cot^{-1}\sqrt{\frac{V^2}{H^2}-M^2}$$

expresses the helix angle in terms of definition and marking efficiency.

While the present invention has been particularly set forth in connection with facsimile recording, it has other applications. The advantages gained apply generally to devices utilizing the intersection between helical and linear elements having the shape shown in Fig. 2 and in which the response is a function of the area of the parallelogram. An example is a scanner in which Fig. 1 may be taken to represent a helical slot 4, and a linear slot 2 cooperating to scan a subject copy 5. The signal in the pick-up photo-electric cell will be proportional to the area of the parallelogram representing the scanning spot. The conclusions reached above, including the curves and formulae, will be valid for a scanner merely by substituting "response efficiency" for "marking efficiency." If we define "response efficiency" as the efficiency with which a desired result is accomplished, whether it be signal in the photo-electric cell or mark on the paper, we have generalized the substance of the invention. Thus, we may say that the invention applies to any device utilizing intersecting helical and linear elements in which the response is a function of the area of intersection.

While the present invention has been shown and described in its generalized form, many specific modifications will be apparent to those skilled in the art and within the spirit and scope of the invention as set forth in the appended claims.

What is claimed is:

1. In an electrolytic recorder for recording on a sheet drawn between marking electrodes, the combination of a linear electrode and a cooperating rotatable helical electrode intersecting to define a marking spot which traces successive lines across the paper, the diameter of the helix being greater than its pitch so that the angle $\theta$ which the helical electrode makes with the linear electrode is greater than 45 degrees, the widths of the electrodes being proportioned so that the ratio of the effective contact width of the helical electrode to the contact width of the linear electrode is substantially equal to $$\sqrt{\sin^2\theta-\cos^2\theta}$$

whereby the recorder provides substantially equal definition in the direction of the traced lines and at right angles thereto.

2. In an electrolytic recorder for recording on a sheet drawn between marking electrodes, the combination of a linear electrode and a cooperating rotatable helical electrode intersecting to define a marking spot which traces successive lines across the paper, the diameter of the helix being greater than its pitch by an amount such that the angle $\theta$ which the helical electrode makes with the ilnear electrode is greater than 45 degrees but less than 75 degrees, the effective contact width of the helical electrode being less than the contact width of the linear electrode, the effective contact width being substantially $$\sqrt{\sin^2\theta-\cos^2\theta}$$

times the contact width of the linear electrode, the factor being less than one for angles of $\theta$ between 45 and 75 degrees, whereby recordings can be made with substantially equal definition in the direction of the traced lines and at right angles thereto.

FRANK A. HESTER.

REFERENCES CITED

The following references are of record in the file of this patent:

UNITED STATES PATENTS

| Number | Name | Date |
|---|---|---|
| 1,958,885 | Carlisle | May 15, 1934 |
| 2,391,768 | Blain | Dec. 25, 1945 |
| 2,413,962 | Finch | Jan. 7, 1947 |
| 2,415,229 | Young | Feb. 4, 1947 |